(12) United States Patent
Nimberger et al.

(10) Patent No.: US 6,361,017 B1
(45) Date of Patent: Mar. 26, 2002

(54) LOCKING VALVE WITH JOINT ALLOWING PACKING SERVICE

(76) Inventors: Spencer M. Nimberger; Robert Ward, both of 16101 Vallen Dr., Houston, TX (US) 77041

(*) Notice: Subject to any disclaimer, the term of this patent is extended or adjusted under 35 U.S.C. 154(b) by 0 days.

(21) Appl. No.: 09/717,463

(22) Filed: Nov. 20, 2000

Related U.S. Application Data

(60) Provisional application No. 60/166,440, filed on Nov. 19, 1999.

(51) Int. Cl.[7] ............................................. F16K 35/00
(52) U.S. Cl. ......................... 251/89; 251/91; 251/111; 137/382.5
(58) Field of Search ............................. 251/89, 90, 91, 251/111, 291; 137/377, 382, 382.5

(56) References Cited

U.S. PATENT DOCUMENTS

| | | | |
|---|---|---|---|
| 2,309,304 A | * 1/1943 | Creighton | 251/91 |
| 2,577,434 A | * 12/1951 | Rosenbaum | 251/89 |
| 2,693,816 A | * 11/1954 | Hoelzer | 251/89 |
| 5,046,523 A | * 9/1991 | Horhota | 251/90 X |
| 6,131,604 A | * 10/2000 | Harriss | 137/382.5 |

* cited by examiner

Primary Examiner—Kevin Lee
(74) Attorney, Agent, or Firm—Mark A. Oathout

(57) ABSTRACT

A valve for a tank containing anhydrous ammonia has a valve mechanism joined to a flow chamber from the tank. The valve mechanism has a bonnet with a hole through a sidewall of the bonnet. A stem valve portion and a stem handle portion are mounted in the bonnet. The stem valve protion is connected to the valve. The stem handle portion is connected to a handle. The handle may be raised or lowered with respect to the bonnet to selectively engage or disengage the stem handle portion from the stem valve portion. A hasp pin may be passed through the hole in the bonnet and locked in such position for preventing the handle from being lowered.

6 Claims, 1 Drawing Sheet

LOCKING VALVE WITH JOINT ALLOWING PACKING SERVICE

This application is based upon U.S. provisional application No. 60/166,440 filed Nov. 19, 1999.

BACKGROUND

Users of anhydrous ammonia, such as farmers, have storage tanks which may sit for example in a field, a yard or another unsecured area.

Anhydrous ammonia is used to make methyl amphetamine, an illegal drug. Therefore, people involved in the development or market for methyl amphetamine may steal anhydrous ammonia from unsecured tanks.

Existing tanks of anhydrous ammonia generally have a connection which includes an excess flow valve within the tank, a flow chamber which directs the flow of anhydrous ammonia to an outlet connection, and a valve mechanism for opening or closing the flow of anhydrous ammonia through the flow chamber.

Presently, one who wants to steal or obtain anhydrous ammonia from the storage tank simply makes a connection to the outlet and opens the valve.

SUMMARY OF THE INVENTION

A valve for a tank containing anhydrous ammonia has a valve mechanism joined to a flow chamber from the tank. The valve mechanism has a bonnet with a hole through a sidewall of the bonnet. A stem valve portion and a stem handle portion are mounted in the bonnet. The stem valve portion is connected to the valve. The stem handle portion is connected to a handle. The handle may be raised or lowered with respect to the bonnet to selectively engage or disengage the stem handle portion from the stem valve portion. A hasp pin may be passed through the hole in the bonnet and locked in such position for preventing the handle from being lowered.

DETAILED DESCRIPTION

Figures 1, 2:
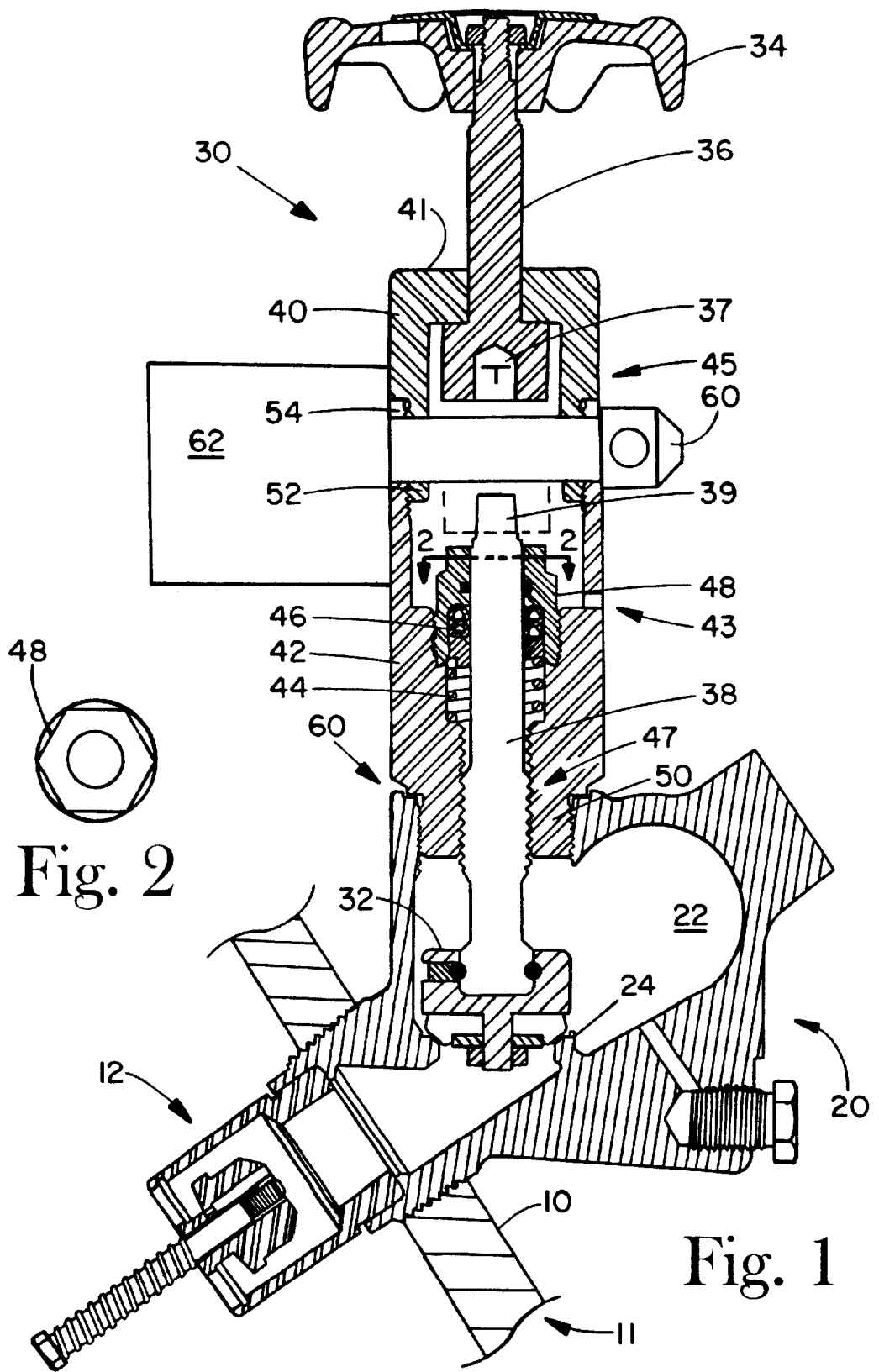
FIG. 1 is an elevational, sectional view of the invention.
FIG. 2 is a view taken along line 2—2 of FIG. 1.

Referring to FIG. 1, an existing tank wall 10 of an anhydrous ammonia tank 11 is shown. An excess flow valve 12 is mounted in the tank 11 and connected to a flow chamber 20. The flow chamber 20 is used for connecting a valve mechanism 30 and for making an outlet connection such as through a right angle outlet or elbow 22. The valve mechanism 30 is connected to the flow chamber 20 and the valve 32 may be closed/seated (as shown) against the seat 24 of flow chamber 20 to prevent flow through or out of the outlet or elbow 22 of flow chamber 20. Or, the valve 32 may be opened by the handle 34 to allow flow of anhydrous ammonia out of the tank 11 via the outlet or elbow 22.

As addressed above, it is desirable to selectively disable the valve mechanism 30 in an easy to use manner. As such, the anhydrous ammonia tank will only be serviceable when the valve mechanism 30 is enabled. This will inhibit the theft of anhydrous ammonia. One way to selectively disable the valve mechanism 30 is to include a lock in the valve mechanism 30 such as a lock for the valve stem. This may be accomplished by making the stem of two separate engageable and disengageable pieces, a stem handle portion 36 and a stem valve portion 38. Then, one can lock the two portions 36, 38 apart from each other to not only disable the valve mechanism 30 but to prevent tampering with the valve mechanism 30.

In the preferred embodiment, the stem handle portion 36 includes a square hole 37 at the lower end and the stem valve portion 38 includes a square tip 39 at the upper end although other known engaging devices may be used. When the stem handle portion 36 is dropped down or lowered by the handle 34, the square tip 39 engages the square hole 37. This enables opening and closing of the valve 32 via threading 47 between the stem valve portion 38 and a bonnet 45.

The stem handle portion 36 and the stem valve portion 38 are mounted in the bonnet 45 which is made of two members, a top member 40 and a lower member 42. Stem handle portion 36 is, e.g., slidable (for raising and lowering the handle) within an opening through the top 41 of top member 40. The stem valve portion 38, a spring 44, a packing set 46 and a packing nut 48 are mounted in the lower member 42. The lower end 50 of the lower member 42 is threaded and joined to the flow chamber 20. The joint 60 is secured by a thread locking compound, such as, for example, one manufactured by Loc-Tite Corporation whereby the joint cannot be released except by heating the joint.

The top member 40 has a threaded lower end 52. The bottom member 42 has a threaded upper end 54. The ends 52 and 54 are normally threaded together to close the bonnet. A hole is made through the sidewall of both the top member 40 and the bottom member 42, for example, at the threaded ends 52, 54. When the stem handle portion 36 is separated from the stem valve portion 38 by pulling on handle 34 a pin such as, for example, a hasp pin 60 may be inserted through the hole and through the threaded end 52 of top member 40 and threaded end 54 of lower member 42. A keyed lock 62 may be placed on the end of the hasp pin 60 to prevent tampering with the valve mechanism 30. The pin 60 prevents or interferes with engagement between the stem handle portion 36 and stem valve portion 38. A single type hasp pin 60 is preferred as it prevents one from cutting the pin with a bolt cutter. However, other types of pins such as a u-shaped pin may be used.

The invention has an additional advantage which relates to facilitation of packing repair. When the hasp pin 30 is removed, one can unthread the top member 40 from the lower member 42. Once the bonnet is taken apart one can back-off the packing nut 48 and perform a packing repair on the spring loaded packing set 46. After a packing repair is completed one can close the bonnet and, either, lock apart the stem handle portion 36 and stem valve portion 38, or drop the handle 34, engage stems 36, 38 and backseat the valve 32 to allow flow of anhydrous ammonia.

The lower end of the sidewall of lower member 42 may have a drain hole 43. The valve mechanism 30 may be retrofitted to existing bodies or flow chambers 20.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever form it may be utilized.

What is claimed is:

1. A valve for a tank containing anhydrous ammonia, comprising:
   a valve mechanism joined to a flow chamber from the tank;
   said valve mechanism including:
      a bonnet having a hole through a sidewall of the bonnet;
      a stem valve portion mounted in the bonnet and connected to the valve;
      a stem handle portion mounted in the bonnet and connected to a handle;
      a means for raising and lowering the handle;
      a means for engaging and disengaging said stem valve portion from said stem handle portion; and
      a means for preventing the handle from being lowered, passing through the hole in the bonnet.

2. The valve according to claim 1, wherein the bonnet includes:
   an upper member having a threaded end; and
   a lower member having a threaded end connectable to said threaded end of said upper member.

3. The valve according to claim 1, wherein said means for engaging and disengaging said stem valve portion from said stem handle portion includes a square tip on the end of said stem valve portion and a square hole on the end of said stem handle portion.

4. The valve according to claim 1, wherein said means for preventing the handle from being lowered, passing through the hole in the bonnet, comprises a hasp pin.

5. The valve according to claim 4, further comprising a lock attachable to one end of said hasp pin.

6. The valve according to claim 1, wherein the valve mechanism is joined to the flow chamber by a joint having a means for locking the joint thereon.

* * * * *